United States Patent Office 2,913,473
Patented Nov. 17, 1959

---

2,913,473

TRIMETHYLSILYL-ENDBLOCKED STEARYL-OXYETHYL-METHYLPOLYSILOXANE

Donald L. Bailey, Snyder, N.Y., assignor to Union Carbide Corporation, a corporation of New York No Drawing. Application December 17, 1957
Serial No. 703,256

1 Claim. (Cl. 260—448.2)

This invention relates to a novel organosilicon composition. More particularly, the invention contemplates the provision of the trimethylsilyl-endblocked stearyloxyethylmethylpolysiloxane represented by the following structural formula:

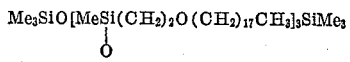

(Mol Wt. 1224)

The invention is based on my discovery that the foregoing polysiloxane can be synthesized by the thermal addition of bis(trimethylsiloxy)tris(methyl, hydrogen, siloxane) [Me$_3$SiO(SiMeHo)$_3$SiMe$_3$] to vinyl stearyl ether [CH$_2$=CHOC$_{18}$H$_{37}$] in the presence of a platinum catalyst. In essence, the synthesis involves the formation of a reaction mixture comprising the Si—H bonded siloxane, vinylstearyl ether, and a small amount of a platinum catalyst, followed by heating of the reaction mixture to cause the components to react under influence of the platinum catalyst to effect decomposition of the silanic hydrogen bond of the siloxane and addition of the resulting silicon and hydrogen free radicals to respective carbon atoms of the carbon to carbon multiple bond of the unsaturated ether, with the production of the desired polysiloxane as an adduct of the component reactants.

The platinum catalyst used in promoting addition of the Si—H groups of the polysiloxane to the unsaturated ether, is preferably employed in finely-divided form, either alone, or in combination with an inert support such as charcoal, and the like, or in the form of a multi-component or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 part to about 5 parts by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction for the production of the addition polysiloxane are also relatively non-critical, and the reaction can be brought to completion with high yields of the adduct by heating the reactants at temperatures within the range 80–180° C. for periods from 4 to 10 hours. In actual practice, I prefer to operate at temperatures within the range 150–160° C. It is relatively essential, however, to effect constant stirring or agitation of the reaction mixture throughout the time of treatment in order to establish and maintain uniform dispersion of the solid catalyst within the liquid reaction phase. In addition, owing to the waxy consistency of the end-product of the reaction, I have found it to be advantageous to employ a solvent such as benzene in effecting removal of the platinum catalyst, recovering the desired adduct from the solvent by conventional distillation.

By reason of the long hydrocarbon chains present within the polymer of the invention, it is particularly useful as a modifier for silicone oils or polymers to give them greater compatibility with organic oils and polymers. In combination with a suitable filler, such as silica, the material finds direct utility as a lubricating grease. In addition, the polysiloxane, per se, is useful as a silicone oil, and may be employed, also, to introduce its functional ether groups into siloxane polymers, in general, by equilibration techniques.

It is believed that the invention may be best understood by reference to the following specific example describing the foregoing principles and procedures as applied to the production of the novel polysiloxane of the invention:

EXAMPLE

*Preparation of trimethylsilyl-endblocked stearyloxyethyl-methylpolysiloxane*

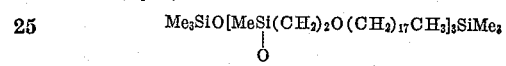

*by addition of bis(trimethylsiloxy)tris(methyl, hydrogen siloxane) [MeSiO(SiMeHO)$_3$SiMe$_3$] to vinylstearyl ether*

Into a one-liter flask equipped with a stirrer, reflux condenser, and thermometer were charged 296 grams (1 mole) of CH$_2$=CHO(CH$_2$)$_{17}$CH$_3$, 94 grams (0.27 mole) of Me$_3$SiO(SiMeHO)$_3$Me$_3$, and 3 grams of one percent platinum-on-gamma-alumina catalyst. The reaction mixture was heated at 150–160° C. with stirring for eight hours. On cooling to room temperature the products congealed to a waxy solid. The products were dissolved in 300 cubic centimeters of benzene, the catalyst removed by centrifuging the solution thus produced, and the benzene was then removed by distillation to 130° C. The products were then vacuum stripped. Vinylstearyl ether, in amount 62 grams, was distilled at a head temperature of 130–150° C. at 0.33 mm. pressure, and with a kettle temperature of 155–175° C., 308 grams of the desired adduct,

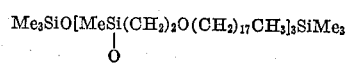

were recovered as a waxy solid.

Proof of the reaction was demonstrated by the fact that only 62 grams of unreacted vinylstearyl ether could be removed from the reaction mixture, whereas the calculated excess at the start of the reaction was 56 grams.

Analysis for silanic hydrogen in the waxy product showed 12 cubic centimeters per gram, while the theoretical silanic hydrogen for the mixture if no reaction had occurred is 73 cubic centimeters per gram. These data establish the yield of adduct at 83 percent of theoretical.

Having thus described the subject matter of my invention, what it is desired to secure by Letters Patent is:

The trimethylsilyl-endblocked stearyloxyethylmethyl-polysiloxane represented by the formula:

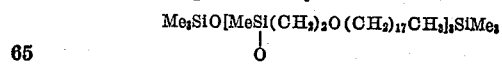

References Cited in the file of this patent

UNITED STATES PATENTS

| | | |
|---|---|---|
| 2,572,402 | Speier | Oct. 23, 1951 |
| 2,823,218 | Speier et al. | Feb. 11, 1958 |
| 2,835,690 | Prober | May 20, 1958 |